US006574685B1

(12) United States Patent
Schwartz et al.

(10) Patent No.: US 6,574,685 B1
(45) Date of Patent: Jun. 3, 2003

(54) SAMPLING TUNING SYSTEM INCLUDING REPLAY OF A SELECTED DATA STREAM

(75) Inventors: Stephen R. Schwartz, 172 Congdon St., Providence, RI (US) 02906; John H. Osmand, Providence, RI (US)

(73) Assignee: Stephen R. Schwartz, Providence, RI (US)

( * ) Notice: Subject to any disclaimer, the term of this patent is extended or adjusted under 35 U.S.C. 154(b) by 0 days.

(21) Appl. No.: 09/288,060

(22) Filed: Apr. 7, 1999

(51) Int. Cl.[7] .................... G06F 13/00

(52) U.S. Cl. .................... 710/31; 710/36; 710/74; 712/225; 713/600

(58) Field of Search .................... 713/600, 601, 713/400, 502; 710/1, 5, 31, 7, 20, 58, 69, 65, 61, 18, 36, 52, 74; 712/225

(56) References Cited

U.S. PATENT DOCUMENTS 4,132,142 A * 1/1979 Campbell .................... 84/115
4,387,620 A * 6/1983 Okamoto et al. ............ 84/1.03
4,662,262 A * 5/1987 Matsumoto ................ 84/1.03
5,424,997 A * 6/1995 Rapp ........................ 365/238.5
5,497,474 A * 3/1996 Todorovich ................ 711/102
5,740,260 A * 4/1998 Odom ........................ 381/119
5,937,096 A * 8/1999 Kawai ........................ 382/236
6,199,076 B1 * 3/2001 Logan et al. ............... 707/501
6,242,681 B1 * 6/2001 Daishoji ...................... 84/604
6,289,165 B1 * 9/2001 Abecassis .................... 386/46

* cited by examiner

*Primary Examiner*—Jeffrey Gaffin
*Assistant Examiner*—Rijue Mai
(74) *Attorney, Agent, or Firm*—Kenyon & Kenyon

(57) ABSTRACT

Embodiments of a method and apparatus are described which provide for a consistent, continuous and/or repeating signal. Such a repeating signal may be used to set the controls for a processor. For example, an embodiment of a preview sampler described herein allows a user to repeatedly output a data segment into a processor so that the processor can be adjusted to achieve a desired effect. Such a method and apparatus provides improved results when compared to an individual attempting to repeatedly generate a data signal (e.g., a note or chord on a musical instrument).

25 Claims, 10 Drawing Sheets

SAMPLING TUNING SYSTEM INCLUDING REPLAY OF A SELECTED DATA STREAM

BACKGROUND OF THE INVENTION

The present invention pertains to a process for providing a consistent, continuous and/or repeating signal. More particularly, the present invention pertains to a method and apparatus for creating a continuous/repeating signal/data stream from an original source signal/data stream, and providing this signal/data stream continuously/repeatedly.

It is known in a variety of arts to use devices known as processors to modify signals from a variety and multiplicity of sources. The processors themselves have varying numbers of controllable parameters, with varying degrees of complexity in the setting of each parameter. Generally, a human operator, or constructed control device, makes these adjustments on the basis of some perception of the results of adjustments as they are made. A common occurrence in the audio field supplies a simple example. In a situation where it is desired to amplify or record a musical instrument, an electronic signal (or digital or other useful signal) is usually presented via a microphone (or other sound transducer) and its associated amplifier. Typically, this signal is then modified through one or several processors such as equalizers, filters, compressors, reverberators, and many other effects devices. A musician will play the musical instrument repeatedly, so a sound engineer can listen to changes in the sound produced by the processor(s) as he varies each control parameter of each processor. Under these circumstances, three problems arise while modifying the signal:

1 The listener must hear ONLY the electronic sound being modified, so the original acoustic sound must be isolated from the listener. This is normally accomplished in a recording studio by having separate, acoustically isolated rooms for playing and listening or by recording the instrument (onto tape, etc.) and then using the recording as the sound source.

Some headphones provide a limited degree of isolation, and are used when isolation from the acoustic sound is impossible (usually in live performance situations) or unaffordable.

2 The performer must play a variety of short phrases over and over, so that the listener can hear the effects of the equipment being used. (With musical material varying, it is difficult to judge whether a change is due to a knob turned or a note played more loudly or differently). This process can be very draining on a performer, as making adjustments carefully enough to get a good sound for either recording or live playing can take a lot of time. Also, many performers are not good at playing a phrase consistently, which makes the listener/engineer's job difficult or impossible.

3 If the performer and listener are the same, and a recording system is not available, the only recourse available (beyond just guessing) is to use headphones, with the limited isolation mentioned above. For loud instruments (e.g., drums), there is no headphone that provides enough isolation to do a good job. For a singer, headphones do not isolate at all, because there is an internal sound transmission through the singer's body.

These problems are not pertinent in situations where the signal does not require acoustic isolation, but other problems may arise. For example, a signal source may have a degree of randomness that makes the adjustment of a processor parameter difficult, although the processor will be able to accomplish its goal once properly set.

SUMMARY OF THE INVENTION

These and other problems are addressed by a method and apparatus of the present invention. According to an embodiment of the present invention, a system can be customized to take a conveniently small test signal (such as a short musical phrase for the example above), record it on a suitable medium, and play it repeatedly into any desired processor or other system. In one embodiment of the present invention, standard components can be used to build a device where:

1. A short length, limited use sampler (or other recording medium) of adequate quality is set into READY MODE,
2. Upon an operator's signal, or upon detecting the desired signal at a pre-selected level (a "threshold"), an appropriate length (e.g., about 1 or 2 seconds) of sound or other signal is recorded, and
3. The recorded signal can be immediately played continuously (i.e. "looped"), allowing the operator to make the necessary adjustments to the processor(s).

Specifically, for the acoustic example above, some of the advantages of the system are:

1. There is no need to record a long section of signal, and no other recording equipment is needed.
2. There is no need for an isolated room.
3. Where the signal is generated by a musician or other person, the performer does not have to play test phrases repetitively, avoiding mental and physical fatigue. Under many circumstances, even a non-musician can generate a phrase well enough so that the performer is not needed for processor adjustments at all. Also, the 'perfect' consistency of a repeated loop is often the ideal signal for adjustments of this type, and is therefor often a better test signal than even a good player may provide.
4. Where the signal is generated by a musician or other person, a recorded version of the signal may be the only possible way to allow that same person to be the operator making adjustments (that is, for the performer to be directly involved in the sound control process). This is particularly true for a singer, who can never be isolated from his/her voice. A recorded signal is the only known solution. In live performance situations, recording may not be feasible or available. The present invention allows a singer to control the process of creating the "sound" that his/her voice will make through the sound system that the audience will be listening to.
5. For any specific circumstance or set of circumstances, experimentation can be used to optimize the length and speed of repetitions to allow quickest adjustment and minimum fatigue in listening.

According to the present invention, this process can be accomplished using a commercially available sampler. This is cumbersome, as it requires patching or switching the sampler into some pre-processor point in the signal path, and requires several steps in the sampler's operation, such as RECORD, TRIM SAMPLE, and SET LOOP LENGTH.

In some circumstances, two (or more) signals may have interactions that require adjustments to be made interactively. One such circumstance is when dealing with acoustic signals, where there is often more than one sound source in use at a time. For example, there may be two instruments playing in close proximaty, such as a violin and a piano. Also, some musical instruments often require the use of more than one microphone (common examples are a piano and a drum set). Each microphone is placed to pick up only a particular instrument or part of an instrument. In practice, the sound from other instruments or unwanted regions of the same instrument "crosses" into all microphones. This is called acoustic crosstalk. The sound of an instrument's crosstalk into other microphones sometimes approaches or even surpasses the level of that instrument's sound in its own microphone. Thus, when modifying a single microphone's signal, it is important to be able to hear the microphone's signal mixed with any other pertinent microphone signal, as well as alone, so that the final product is as desired. A two channel version of the system, one channel for each signal, accomplishes this.

The problems as described for two source signals are the same for more than two source signals. The solution is to have one channel for each signal. For circumstances where this is not practical, a method is provided to accommodate multiple signal channels with the use of only two sampler channels; channel A for the signal being modified, and channel B for a mix of all other pertinent signals as they will be perceived in relation to channel A. For the acoustic example described above, by turning channel B off and on, the listener can switch back and forth between the single microphone alone (where it is easiest to hear how the sound is being affected) and in combination with all the other microphones, (which will be the final product required). This embodiment is presented below, along with a switching mechanism to facilitate use with a multiplicity of signals that need to be adjusted.

DETAILED DESCRIPTION

Figure 1:
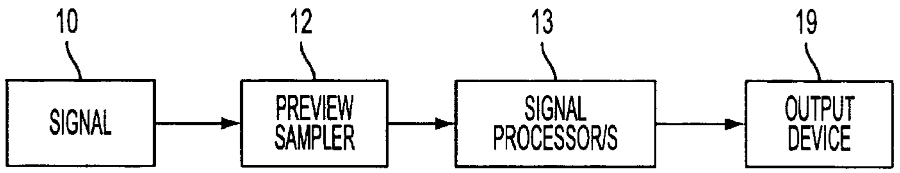
FIG. 1 is a general block diagram of an apparatus constructed according to an embodiment of the present invention.

Referring to FIG. 1, a block diagram of an apparatus which facilitates the tuning of a signal in a processor or processors is shown. An appropriate length of a source signal 10 is fed to and recorded by the preview sampler 12. The preview sampler then repeatedly plays the recorded signal and supplies it to the input of the signal processor(s) 13, whose output may be supplied to an output device 19 such as a loudspeaker system or television screen. Using the example of audio frequencies (approximately between 20 Hz and 20 kHz), this component can be constructed by using a typical digital audio sampler, such as a Kurzweil K-2000, as the preview sampler 12. The following description is written at a level for a user skilled in the use of the K-2000 specifically, though one generally skilled in the art of the modern sampler use will understand it. Aside from showing an implementation of the method using a general purpose device, the example also shows how cumbersome it is to use such a general purpose device for the method, as opposed to an embodiment of the present invention specifically designed for the purpose (whose description immediately follows this example). The signal (10) output is easily coupled into the input of the sampler, and the output of the sampler is connected into the input of the signal processor(s) 13. Input and output levels are set, as is generally known in the art. Through a complex operation one could operate the sampler as follows, described for the example of the Kurzweil K 2000 (words in capital letters are either buttons to press, "soft buttons" to press, or parameters to set):

1. Set the sampler into record ready mode, set to start recording upon the signal's crossing a threshold:
   - A-Press [MASTER/SAMPLE]
   - B-Set these parameters (the signal must be present to the sampler when setting the GAIN and THRESHOLD parameters):
     - [SAMPLE]=Set this value to none.
     - [INPUT]=Analog
     - [TIME](length)—is only available in whole unit seconds
     - [MONITOR] to [ON] if needed
     - [GAIN] as is suitable (e.g. at 0)
     - [RATE] to 44.1 kHz
     - [MODE] to 1 or 2 channels (max available are 2)
     - [THRESHOLD] to an amount somewhat less than the signal appears in the sampler's meters.
2. Send the signal (e.g., play an instrument) and record it into the sampler's memory:
   - C-Press [AUTO], then send the signal/play the instrument.
   - D-the sample number that has been assigned should be noted, which is needed to edit in step 3, and to eventually erase when done.
3. Set the sampler into sample edit mode, in order to trim the length of the sample to a useful length:
   - E-Select [EDIT] (you're still in [MASTER/SAMPLE] mode, with the sample number unchanged).
   - F-Hold down the C64 note on the keyboard (a piece of adhesive tape may be used for this purpose).
   - G-Move to [L] (=loop) parameter with arrow button.
   - H-Set the [L] parameter to the start point (0.000).
   - I-Move to [E] (=end) parameter with arrow button.
   - J-Set the [E] parameter, so that the length of the loop is convenient (depends on material—my experience shows a typical repeat speed would be about ¾ second for a single note or chord from a musical instrument).

4. Set the sampler into play looped mode (looped play means continuous replay, with no time between each replay).
   K-continue to hold down the C 64 note on the keyboard
   or
   1-Save the sample as set for length above, [EXIT]/[YES]/[REPLACE]
   2-Then create a one measure song in the sampler's song mode, setting the tempo that is convenient for tuning. This process includes the following steps:
   [SONG]/set [PROGRAM] to the number above/[MISC]/[RECMODE]=Linear/[PLAYMODE]=Loop/[COUNTOFF]=1/[MAIN]/arrow to [TEMPO] & set to 80, for example/set [RECTRK] to 1/[RECORD]/[PAUSE] then after countdown bar, evenly play four beats, then press [STOP]/[YES]/[REPLACE]/[PLAY]/adjusting [TEMPO] as needed.
5. Start tuning the processor(s) 13.
6. Repeat the above for each signal sample.
7. When done, erase these samples and songs from memory. A few steps under [MASTER/SAMPLE] and perhaps [SONG] are needed to do this.

The above explanation requires some knowledge of the K2000 (e.g., knowing which controls affect which parameters). Each brand and model of sampler operates differently, and instructions for any other model would thus be different, though similar in nature and scope. The K2000 is but one example and one skilled in the art will appreciate that another apparatus can be used as preview sampler 12.

Turning now to an example of a preview sampler 12 constructed according to an embodiment of the present invention, the connections are the same as above. Signal 10's output is connected to the input of the preview sampler 12, and the output of the preview sampler is connected to the signal processor(s) 13. Levels are set, as is generally known in the art. This embodiment requires only two controls: a Record Ready button, and a Loop Length setting control. The sequence of over 20 actions described in #s 1–7 above are replaced by the following:

1. (OPTIONAL) Adjust loop length control knob if preset length is not suitable.
2. Set a trigger threshold.
3. Press the record ready button.
4. Send the signal (e.g., play an instrument).
5. Start tuning the processor(s) 13.
6. Repeat the above for each signal sample.

Alternatively/additionally, the loop length can be adjusted during the tuning process, as desired. Input and output gain controls may be added where desirable. The recording process begins at the crossing of a threshold by default, but an option to begin immediately upon an operator control signal is made available. One example of a threshold detector, commonly known in the art, is seen within FIG. 10, element 92.

Figure 2:
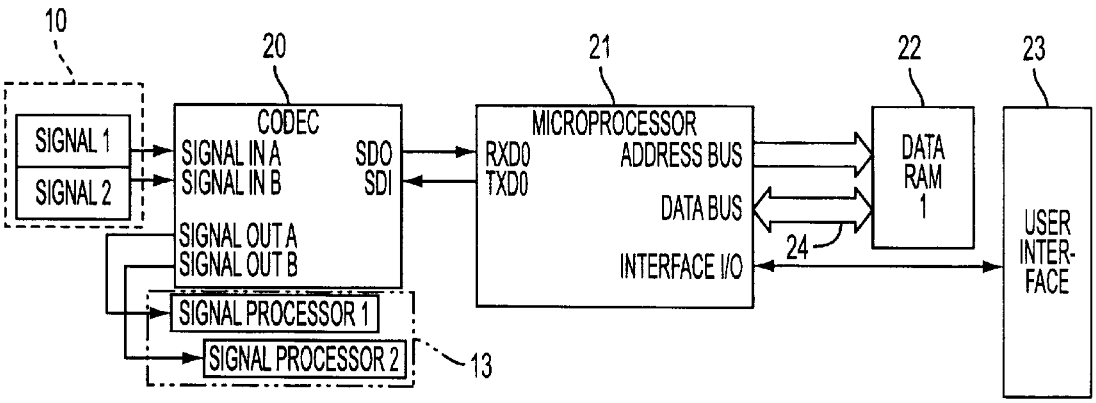
FIG. 2 is a detailed block diagram of the apparatus of FIG. 1, shown as a two channel device.

FIG. 2 shows one embodiment of this design. As audio frequency codices commonly come as dual channel designs (to accommodate stereo signals for the consumer market), this example is shown with two channels. One channel or multichannel devices may also be used. User Interface 23 may include a status display; 'Record Ready', 'Stop', 'Sample Length', 'Tempo' and 'Trigger Threshold' controls. Some devices may permit the use of Data Bus 24 for the input from and output to User Interface 23, instead of the separate I/O port as shown.

The operator sets a trigger threshold, and then sends a control signal from user interface 23 to microprocessor 21 to begin the record/play sequence. Source signal/s 10 are fed into the signal input/s of the Codec 20, which performs an analog-to-digital conversion (and also, later in the signal flow, a digital-to-analog conversion). The digitized signal is sent out codec 20's Serial Data Output (SDO) to the Receive Data 0 port (RXD0) of Microprocessor 21, which writes the data to Memory 22 via the microprocessor's Address Bus. When recording to memory is complete, the Memory 22's contents are continuously read via the microprocessor's Data Bus 24, and sent out microprocessor 21's Transmit Data 0 port (TXD0) to the Serial Data Input (SDI) of Codec 20. Codec 20 converts the received data into analog signal/s, and presents them at its signal outputs. The signal/s may then be sent to the Signal Processor(s) 13.

Figure 3:
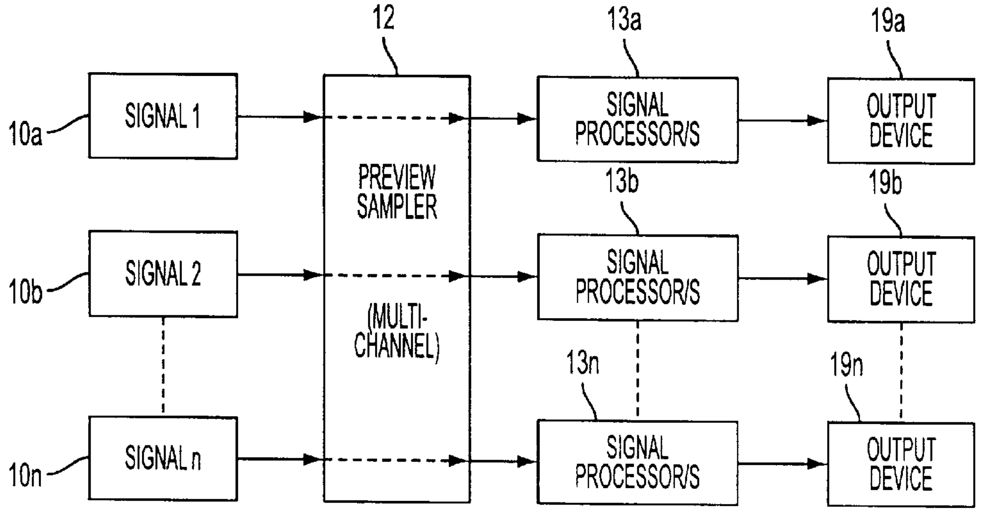
FIG. 3 is a general block diagram of the apparatus of FIG. 1, but constructed as a multi-channel device.

FIG. 3 shows a multi-channel version of the embodiment in FIG. 1, for situations where several simultaneous signals 10*a,b*, . . . 10*n* require individual processing. Each channel is identical to the single channel of FIG. 1, but they all operate simultaneously and are simultaneously controlled by a single set of controls. This is particularly helpful where the outputs of processors 13*a,b*, . . . *n* interact, and may therefore affect the adjustment of each other's processor settings. A common example is where the outputs of a variety of audio signals will be combined, as when the output of several microphones placed near one or more musical instruments or voices are mixed to the two channels suitable for a common stereo. In these situations, there is likely to be a significant amount of acoustic crosstalk found in the microphone signals. The embodiment may include as many channels as are needed (or affordable) for a given situation. Once the levels have been set for each signal path, the operation of the preview sampler is the same as described above for the embodiment of FIG. 1, regardless of how many channels are involved. This embodiment allows processor adjustments for different sources to be made concurrently, and with a single sample recording.

Implementation is possible with inexpensive, relatively slow microprocessors, as all that is required is a simple read/write instruction cycle. However, for signals that have a significant bandwidth, device limitations need to be accounted for. As the number of signals to be sampled increases, the processor needs to be faster and/or able to handle multiple inputs, as well as able to address larger data memory blocks. Also, all the devices must be able to read and write at an appropriate rate. Consider the relatively small bandwidth (about 20 kHz) of this audio example: for the commonly accepted audio standard of 16 bit resolution at 44.1 kHz, the microprocessor must run somewhat in excess of 0.7056 MHz, multiplied by the number of signals. One way around this ever increasing burden on the components (especially the microprocessor) is the use of multiple sets of (codecs+microprocessors+memory) running in parallel, one set for each signal or pair of signals.

Figure 4:
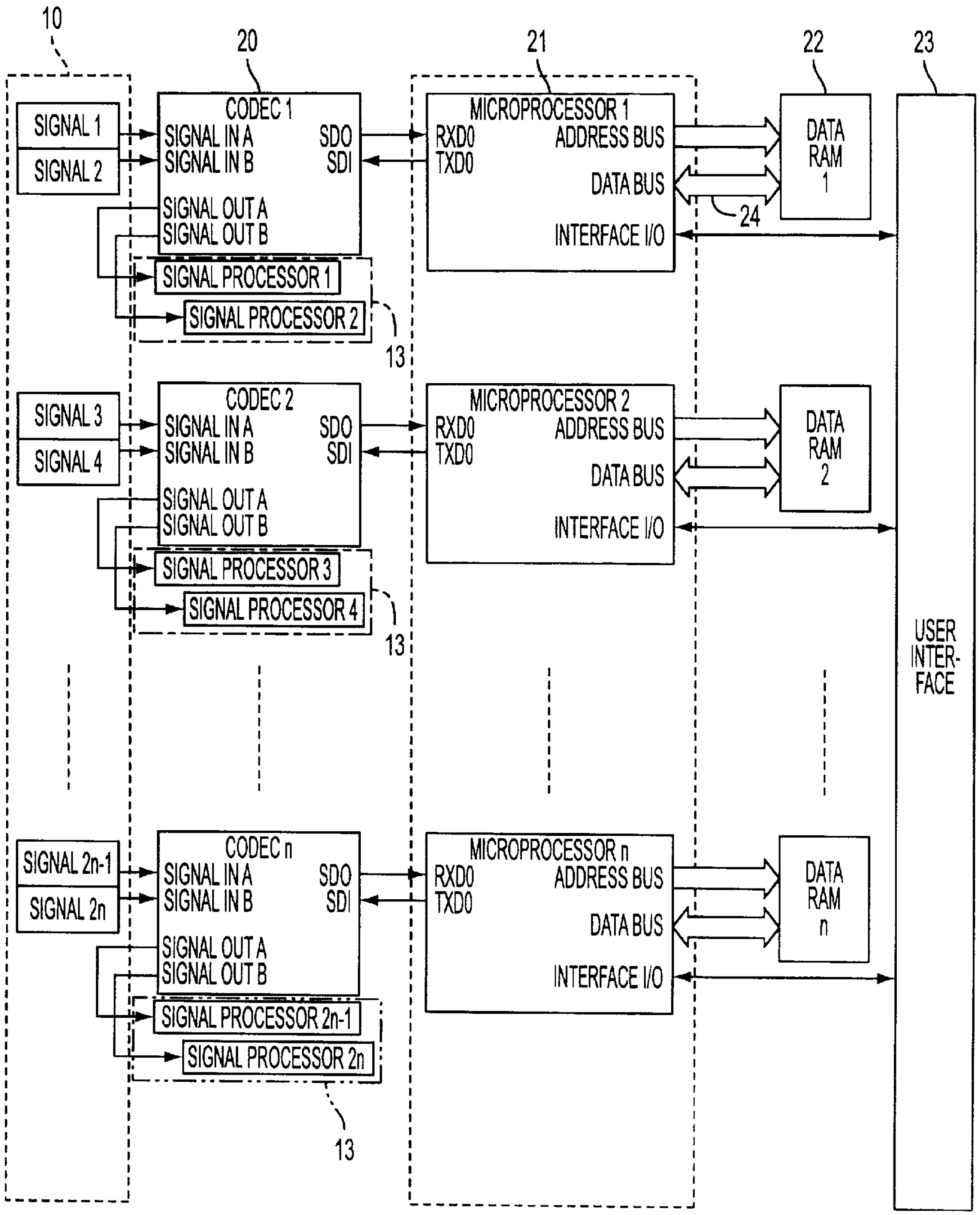
FIG. 4 is a multiple channel block diagram of the apparatus of FIG. 3, using parallel microprocessors.

FIG. 4 is one implementation of the embodiment of FIG. 3, using parallel sets of the type shown in FIG. 2. The function and operation is the same as for FIG. 2, except that the user interface 23 interfaces with all the microprocessors 21. In this example, the codecs 20 shown are 2 channels each, hence the total of 2n possible signals, rather than just n. The number of these sets of codecs+microprocessors+memory may be expanded to the limits of the fanout of a common clock and user interface.

Figure 5:
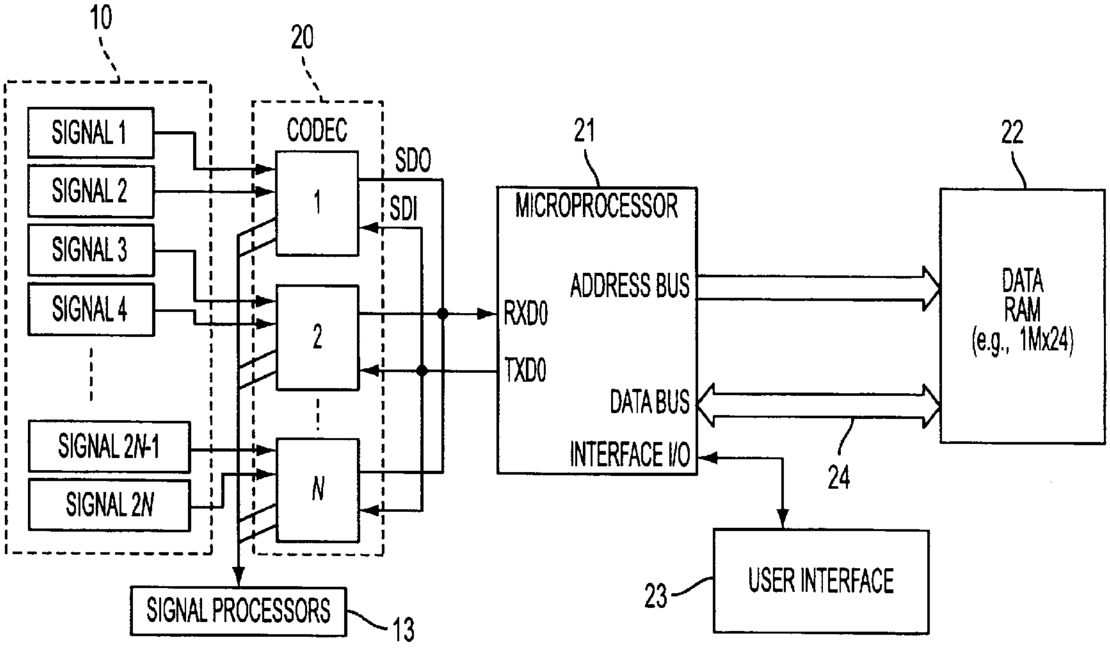
FIG. 5 is a multiple channel block diagram of the apparatus of FIG. 3, using a single microprocessor.

FIG. 5 shows a second implementation of the embodiment of FIG. 3, in this case using a single microprocessor instead of a group of parallel microprocessors. Integrating the digital signal inputs to a single microprocessor 21 may provide advantages, including cost and a flexibility for other uses and/or configurations: one example is a mode wherein a single channel at a time is sampled for independent playback, rather than recording all channels at once, which allows a longer sample time for a fixed amount of memory. For reasons stated above, this example uses two channel codecs, which expands the total of possible signals from n to 2n.

The interface, function and operation are the same as in FIG. 2. The operator sets a trigger threshold, and then sends a control signal from user interface 23 to microprocessor 21 to begin the record/play sequence. Source signals 1–2n 10 are fed into the signal inputs of the Codecs 20, which perform analog-to-digital conversions (and also, later in the signal flow, digital-to-analog conversions). The digitized signals are sent out the codec 20 Serial Data Outputs (SDOs) to the Receive Data 0 port (RXD0) of Microprocessor 21, which writes the data to Memory 22 via the microprocessor's Address Bus. When recording to memory is complete, the Memory 22's contents are continuously read via the microprocessor's Data Bus 24, and sent out microprocessor 21's Transmit Data 0 port (TXD0) to the Serial Data Inputs (SDIs) of Codecs 20. Codecs 20 convert the received data into analog signals, and present them at their signal outputs. The signals may then be sent to the Signal Processors 13.

Figure 6:
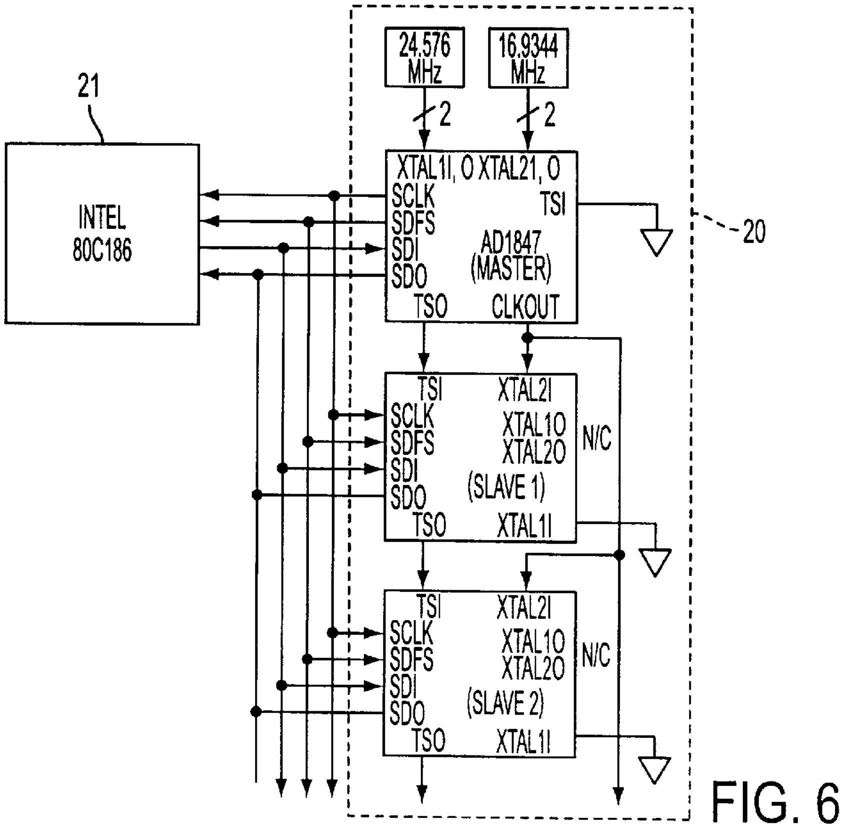
FIG. 6 is a detailed view of part of the apparatus of FIG. 5.

Referring to FIG. 6, a possible arrangement for the device of FIG. 5 uses Analog Devices' AD1847 CODEC ADC/DAC dual-channel devices. For an eight-channel sampler, four daisy-chained Codecs 20 (three are shown) may be interfaced with the low-end Intel 80C186 microprocessor 51 through one or two serial ports. The microprocessor can directly address 1 MegaByte of RAM and can refresh dynamic memory. Utilizing its 24-bit data bus, the effective direct memory capacity is 3 Mbytes. For longer record times, the CODECs can be configured for 8-bit data conversion, either linearly or with a companding algorithm. Audio dynamic range is reduced, but total record time available is twice that of 16-bit data storage. Alternatively, other addressing schemes or a microprocessor with a larger address bus may be used where storage requirements are greater than the limits of this particular device.

Figure 7:
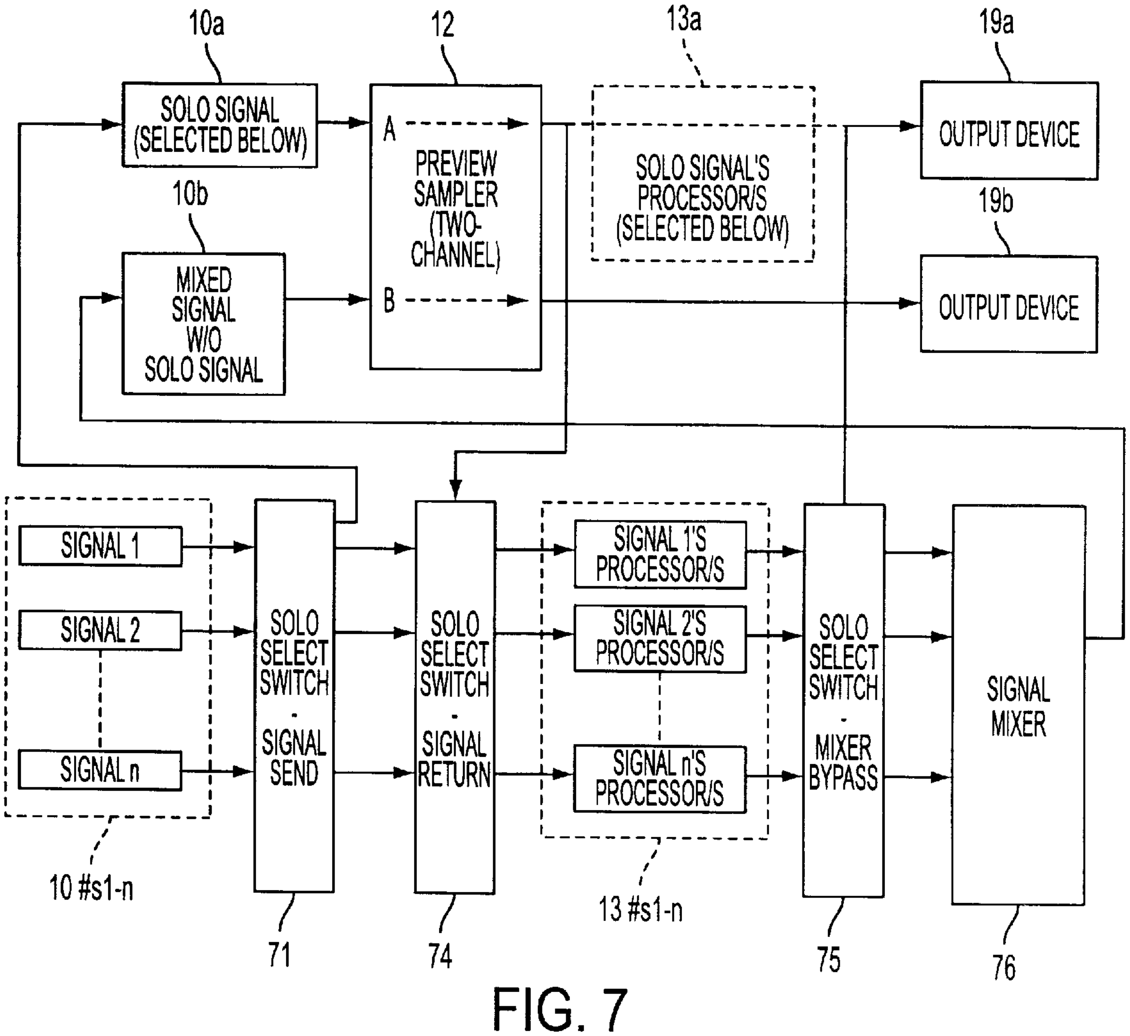
FIG. 7 is a general block diagram of an embodiment that allows a two channel device to substitute for the multi-channel embodiment of FIG. 3.

FIG. 7 shows a block diagram of a method for imitating the capabilities of a multi-channel preview sampler by combining a one or two channel version with a switching network. Here, a two channel version of the embodiment in FIG. 1 is combined with a switching and mixing matrix to allow the adjustment of the processors for a plurality of source signals. This embodiment only allows the tuning of one source signal at a time, and a new sample must be recorded for each change of signal to be tuned. It is therefore not as convenient as the multi-channel embodiment of FIG. 3, but may be cheaper and/or more flexible in some situations. A two-channel embodiment of the preview sampler of FIG. 1 (e.g., as in FIG. 2) can be used as a stand alone device by cabling the inputs and outputs to insert it appropriately within the signal path of a multi-channel signal mixer. However, the sampling and tuning process is significantly easier to use when integrated with a multi-channel signal mixer and automatic signal switching system.

One of the signals 10 is selected to be adjusted, designated the Solo Signal. A switching system (not shown here, but discussed with FIGS. 9–14) simultaneously affects the three Solo Select Switches 71, 74 and 75. Switch 71 removes the output of the Solo Signal from its normal path to its processor(s), and redirects it to channel A of preview sampler 12. Switch 74 connects the channel A output of preview sampler 12 to the input of the signal processor(s) that pertain to the selected solo channel. Switch 75 directs the output of the selected solo channel's processor(s) to output device 19*a*.

All other signals are passed directly to their designated processor(s), whose outputs are sent to signal mixer 76. This mixer is set to maintain the ratios of signal strength, in balance with the output at the selected solo channel's processor(s) output, that will be used in the final mix (after processor adjustment is completed, and the preview sampler is effectively removed from the environment). The mixer's output is directed to channel B of the preview sampler 12. The output of this channel B may then be directed to output device 19*b*. Note that, as the channel B recording is of a mix of signals after they have passed through their processor(s), adjustments made to any processor(s) that go to channel B of sampler 12 will not affect the signal sent to output device 19*b*. Thus, a new recording must be made each time a different signal's processor(s) will require adjustment.

In this embodiment, the output of a selected 'Solo' signal is available via its processor(s) at 19*a*, and the sum of all other signals present is given at 19*b*. This allows the adjustment of each and/or all signal processor(s), sequentially, allowing the adjustments to made with or without the influence of the total signal field. Where each signal channel is completely independent, there is no need for the mix of other channels. In this case, a single channel version of Preview Sampler (FIG. 1) may be used, and items 10*b*, 76, and 19*b* would be eliminated from FIG. 7.

Figure 8:
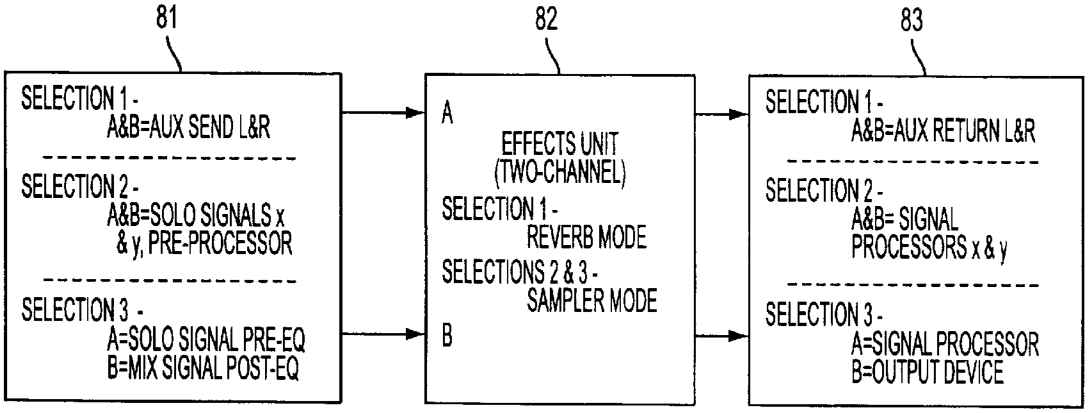
FIG. 8 is a general block diagram of an embodiment which incorporates a multi-purpose device for the preview sampler 12 of the apparatus of FIGS. 1 and 3.

FIG. 8 shows a general block diagram for the use of a common, pre-existing reverberation or effects unit adapted/modified for use as a one or two channel sampler unit in addition to its normal function. This enables an embodiment of the present invention with a minimum of cost and effort. These devices are commonly available as two channel units, so this example is described for two channels, which adds functionality to Selections 2 and 3 below. Where desired, a single channel is implemented similarly. Almost any digital stereo reverb unit can be modified to function as such a preview sampler. The actual modifications are described below; seen here is how the unit functions in its environment.

Three possible and likely arrangements, which may easily be accomplished by a function select switch, are:

Selection 1) The unit operates as it normally does, set for an effect processing program, such as reverberation. It can be situated in a two channel insert point in a signal mixer's auxiliary send/return loop. The signal to Effect Unit 82's inputs A and B are from auxiliary send outputs 81 left and right (or mono) of a common signal mixer. Outputs A and B of Effects Unit 82 are directed to the auxiliary return inputs 83 left and right of the common mixer.

Selection 2) The unit is set to sampler mode, (described below). The signal to Effect Unit 82's inputs A and B now come from two independent signal sources 81, such as the amplified signals x and y from two microphones set to record a piano. Outputs A and B of Effects Unit 82 are then directed to the inputs 83 of the signal processor(s) x and y that pertain to the signals x and y.

Selection 3) The unit is set to sampler mode, as for Selection 2 above, and then becomes the two channel device 12 of FIG. 7, fully described above.

Figure 9:
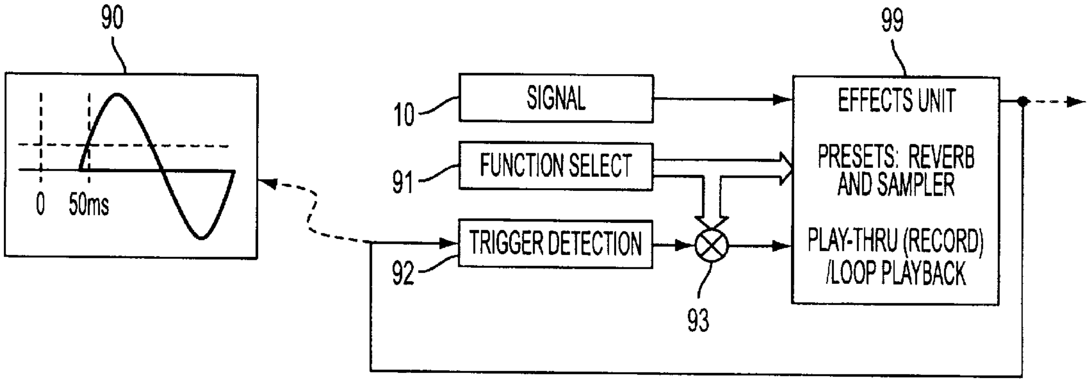
FIG. 9 is a general block diagram of an apparatus that employs various aspects of the method of the present invention.
Figure 10:
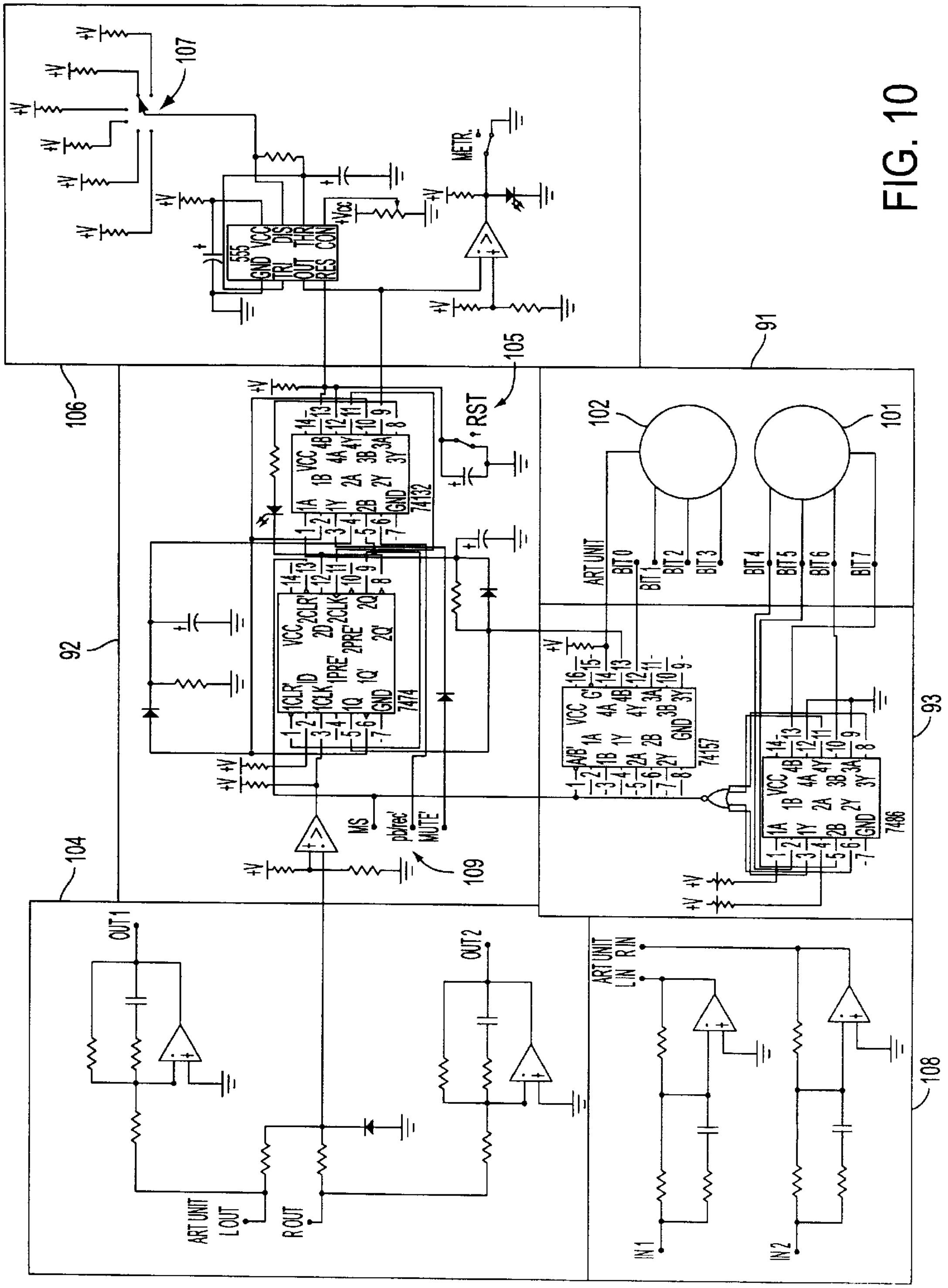
FIG. 10 is a detailed schematic diagram of an implementation of FIG. 9.

FIGS. 9 and 10 show an embodiment that includes the use of a modified, pre-existing effects processor (not shown). A device used for this example may be an OEM reverb/effects unit from ART (Applied Research and Technology, Inc.), with two separate input/output channels, marked L and R in 108 and 104. (A mono mode is available if longer loop times are needed with the given size of the on-board memory, though this reduces functionality to a single signal). The ART unit has 255 preset functions arranged into 16 banks selected with data wheel 101. One bank is used for sampling, with 8 pairs of presets, each pair comprising a recording function and a playback function, with its own loop time corresponding to a metronome marking. A loop time T is selected from the preset pairs via data wheel 102. Sampling is enabled by creating a continuously recording function, using the unit's one-tap delay at length of T-50 ms (milliseconds), with no feedback (=0% regeneration). This makes the output signal equal to the input signal, but it comes out T-50 ms later. Trigger circuit 92 monitors the loop's output so that mode switching occurs after the full waveform has been written to memory. When the trigger device 92 is set by reset switch 105, it waits for this output to go above a preset threshold, illustrated by the sine wave 90 crossing a dotted line. The trigger output is then active until reset by reset switch 105. A logic gate 93 uses the trigger output signal as the least significant bit in the preset pairs for sampling. An active trigger signal switches the unit's preset from sample record to playback by toggling the least significant bit. Gate 93 uses the least significant bit from preset data wheel 102 for all other (non-sampling) banks. Playback-type presets change from recording-type presets by turning off the input, changing regeneration to 100%, and setting the loop time to T. This makes the output signal equal to what the output signal was T ms before, effecting a continuously played loop of length T. The method of triggering from the output combined with the play loop's extra 50 ms time adds the 50 ms to the beginning of the record loop, so that the beginning of the signal is not cut off by the triggering mechanism (the entire triggering sequence takes less than 50 ms to accomplish). 50 ms is chosen for this example because it is the length of time required to capture a 20 Hz signal, the longest waveform in practical audio use. The trigger circuit also generates a control flag 109 during the wait state of recording, to be used for multi-channel switching schemes. During the wait state the trigger circuit flashes an LED at a tempo determined by independent metronome 106 via rotary switch 107. In playback it is constantly lit; otherwise it is off. Also the system includes a pre-emphasis 108 and post-de-emphasis 104 of mid to high frequencies, to ensure a smooth splice from the end of one loop to the beginning of the next by effectively filtering out unnatural clicks from sudden voltage changes.

Figure 11:
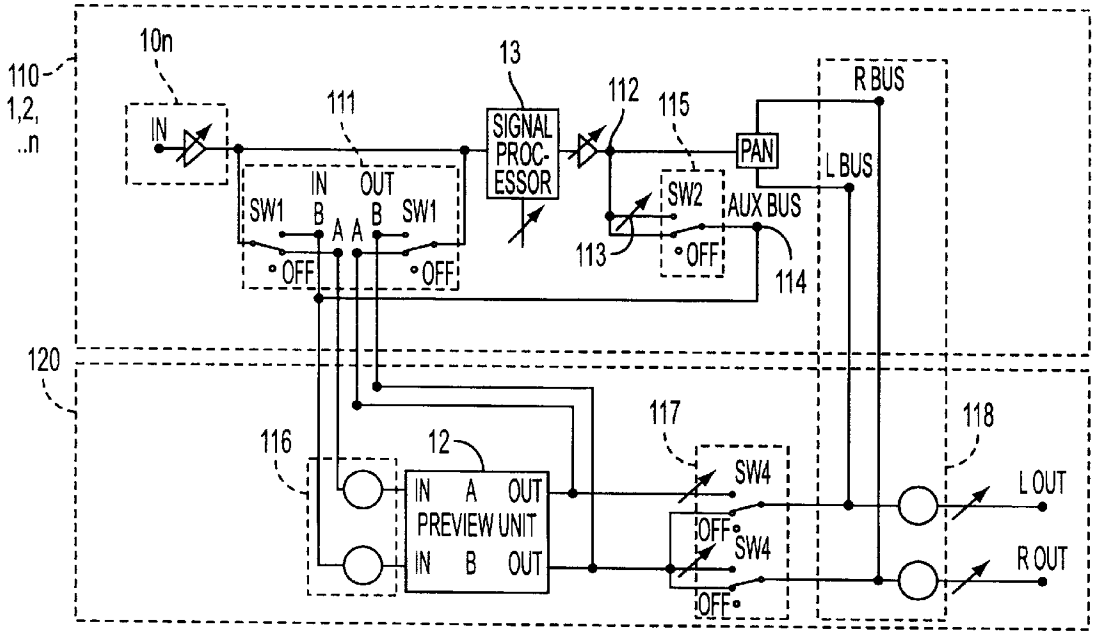
FIG. 11 is a block diagram of an embodiment of the apparatus of FIGS. 9 and 10, incorporated into a signal mixer.
Figure 12:
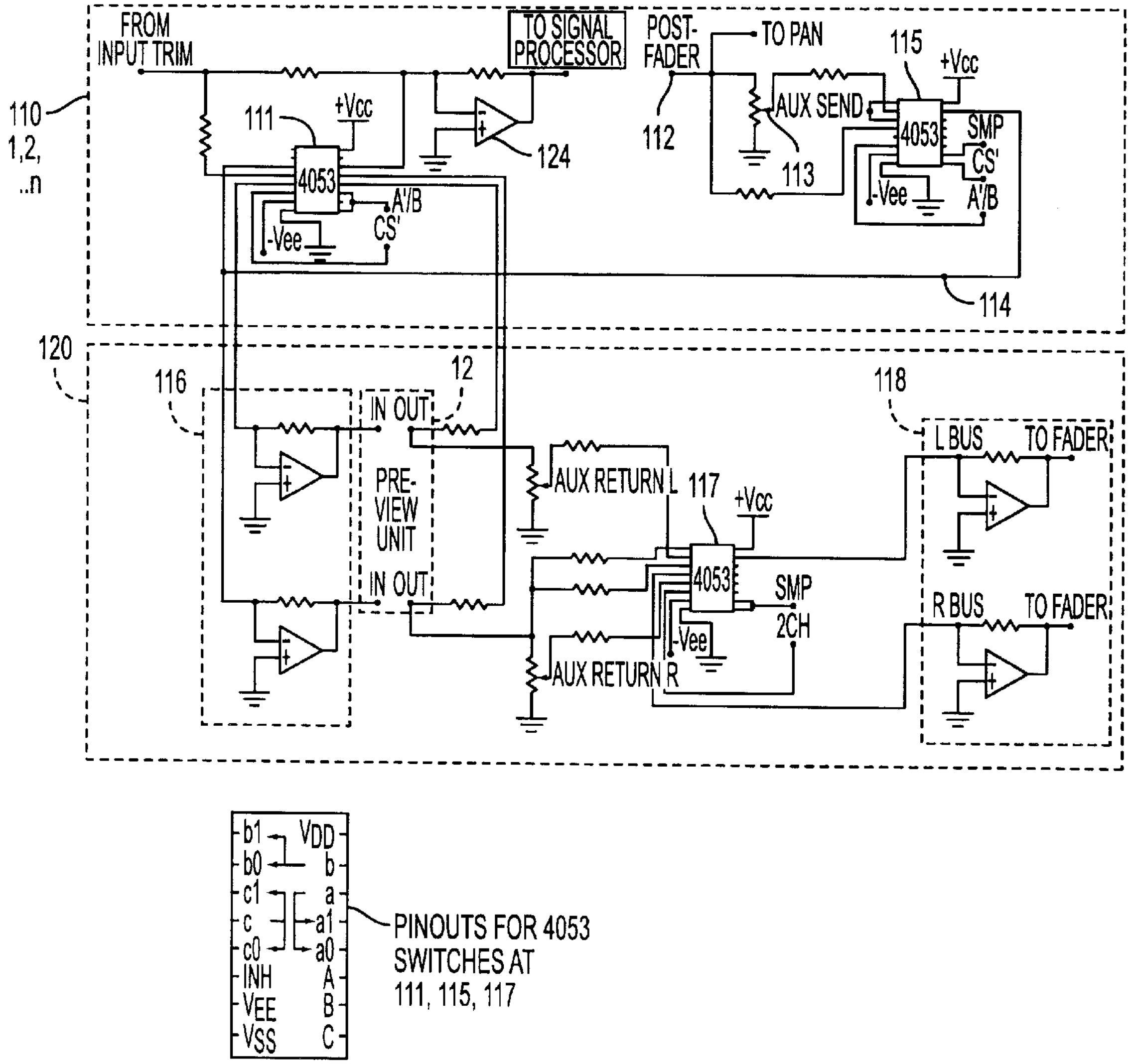
FIG. 12*a* is a detailed schematic diagram of the apparatus of FIG. 11.
FIG. 12*b* shows the pin-out arrangement for a switch used in FIG. 12*a* and FIG. 13.
Figure 13:
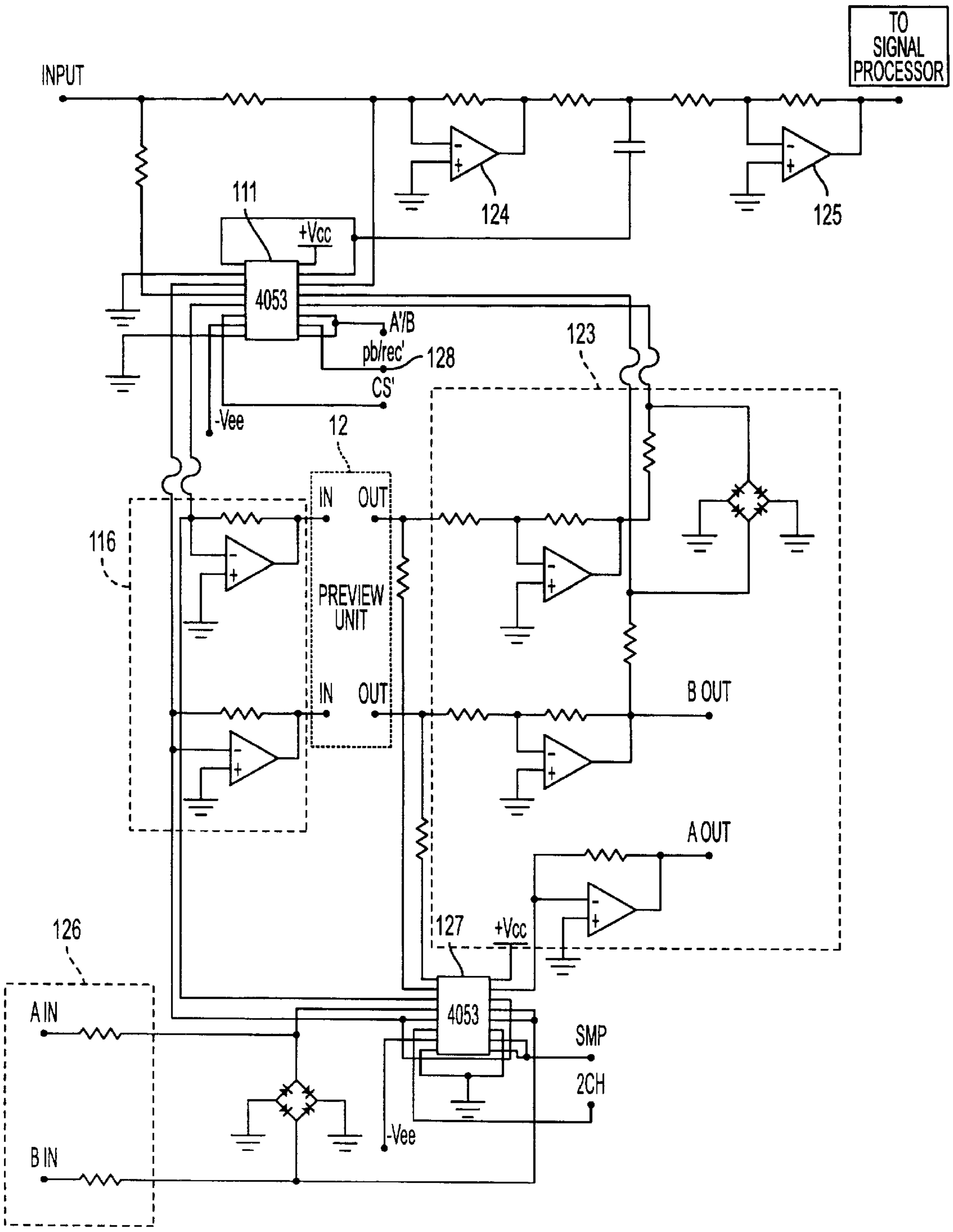
FIG. 13 is a schematic diagram of an embodiment of the apparatus of FIGS. 9 and 10, designed as a stand-alone unit to be interfaced with a separate, pre-existing signal mixer.
Figure 14:
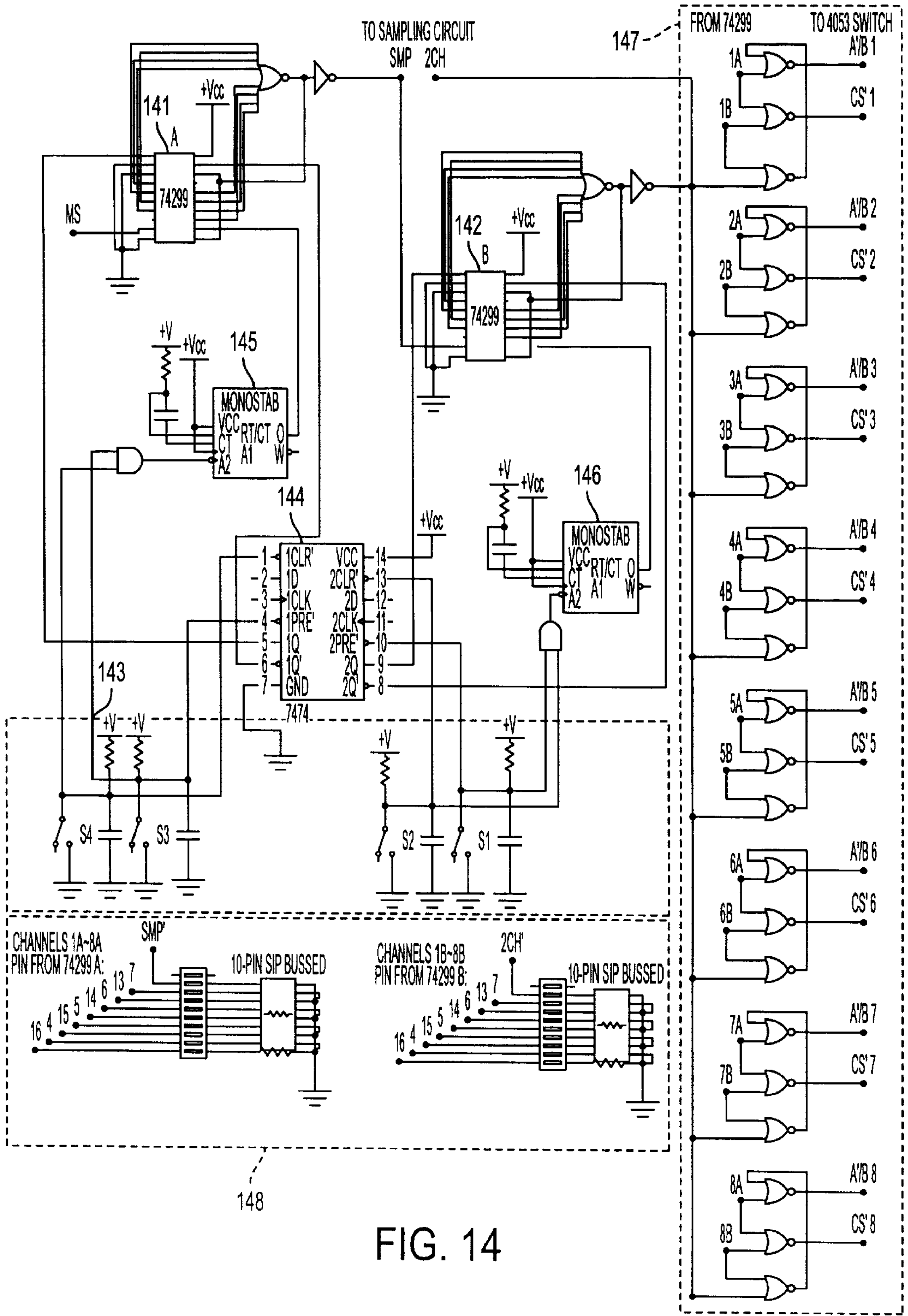
FIG. 14 is a schematic diagram of one possible implementation of a selection control device to be used with the apparati of FIGS. 11–13.

FIGS. 11–14 show some details for accomplishing the method of FIG. 7. While a two-channel preview-sampler can be used as a stand alone device by cabling inputs and outputs to insert it appropriately within the signal path, the sampling and tuning process is significantly easier to use when integrated with a multi-channel signal mixer and automatic signal switching system, as shown in FIG. 7. Two versions are discussed here. FIGS. 11 and 12 show a design that is to be built into a signal mixer (e.g., as part of the manufacturing process). FIG. 13 shows a stand-alone unit, to include an automatic switching system and signal interface, designed to be externally connected to a typical pre-existing signal mixer. FIG. 14 shows one implementation of a selection control device, for use with either of the two versions.

For this purpose, a switching network should accomplish the following tasks:

1. input the pre-processed signal into sampler channel A,
2. output the sampled signal of channel A into the processor to be tuned,
3. input the final post-processor mix of other signals, minus the tuning signal, into sampler channel B, and
4. output the sampled mix of channel B.

The output levels of channels A and B must be the same as in the final mix (the same as if there were no sampling system in place at all). For the dual channel (x & y) scenario of FIG. 8's Selection 2, the switching network would only need to perform tasks 1 and 2 noted above for both sampler channels A and B. The accommodation of all three selections of FIG. 8 (normal effect processing, two signal sampling, and single signal plus mix signal sampling) makes for a complicated array of switching.

FIG. 11 and FIG. 12*a* show a block diagram and detailed schematic of an implementation of the automatic switching process. One circuit block 110 is needed for each signal channel. To implement these switching modes requires at least a Double Pole Double Throw (DPDT) on-off-on switch 111 and a Single Pole Double Throw (SPDT) on-off-on switch 115, as well as a DPDT on-off-on switch 117 at the output of the preview sampler circuit 12. All switches can be digitally controlled. FIG. 12*b* shows the pin-outs for the 4053 switches of FIG. 12*a*. The switches respond to four one-bit control signals: two universal mode messages, "Sample" (SMP) and "Single/Dual," (2CH) and two channel specific messages, "Channel Selected" (CS) and "A/B Path" (A/B). The table summarizes the functions described below.

| Mode | SMP | 2CH | CS | A/B | SW 111 | SW 115 | SW 117 |
|---|---|---|---|---|---|---|---|
| Normal | L | L | L | L | OFF | UP: Reverb In | UP: Reverb Out |
| Single + Mix Channel | H | L | L | L | OFF | DN: Mix B In | DN: Mix B Out |
| Channel Select (A) | H | L | H | L | DN: A I/O | OFF | DN: Mix B Out |
| Dual Channel | H | H | L | H | OFF | OFF | OFF |
| Channel Select,A | H | H | H | L | DN: A I/O | OFF | OFF |
| Channel Select,B | H | H | H | H | UP: B I/O | OFF | OFF |

H = logic level high, L = logic level low, UP = up/DN = down position in diagram, OFF = not conducting Switch 111 of a particular signal mixer channel 110 is used to direct signal into and out of the preview sampler circuit 12 when that channel is selected for tuning. It responds to "Channel Select," which activates it, and "A/B Path," which chooses the sampler channel to be used. Otherwise it is off.

In "Single+Mix" mode, the selected signal's Switch 111 is set ON to Channel A sending signal from input 10*n* (shown here as a trim circuit) to the mix amp 116. The output signal of preview sampler 12 is routed to amp 124 and subsequently to the signal processor 13. It is set to OFF at all other channels.

In Dual Channel mode, two selected signals have their Switch 111 set to ON, one for Channel A and another for Channel B, allowing the tuning of a signal processor 13 for two different channels simultaneously. It is set to OFF at all other channels.

In "Normal" mode, every Switch 111 is OFF (the sampler is not used at all).

Switch 115 sends a post-processor and post-fader signal 112 to a mix at the sampler's Channel B input 116, before or after an additional fader 113. OFF sends no signal.

In "Single+Mix" mode, Switch 115 is ON for all signal mixer signals but one; it is OFF for the signal selected for tuning in Channel A. Thus, Channel A has the signal being tuned, and Channel B has a mix of everything else. Previewing with Channel B off and on provides a comparison of how the mix affects the tuned signal.

In "Dual-Channel" mode, every Switch 115 is OFF since no mix is needed.

In "Normal" mode, every Switch 115 can be set to send a post auxiliary fader signal to an auxiliary bus 114, to allow the device used as preview sampler 12 to be used for another purpose, e.g. for reverberation. Note that in the example of FIGS. 11 and 12, we assume the effect unit to be set to synthesize a stereo reverb field from a monophonic source signal. This is a common technique, and allows for a simplification of the drawings. Thus, in "Normal" mode, Auxiliary bus 114 is a single channel that feeds only the B input of Preview unit 12.

Switch 117 interfaces the sampler outputs with the Left/Right master output bus 118.

In "Single+Mix" mode, the mono mix of Channel B is sent to both Left and Right outputs at unity gain, and Channel A does not directly reach the master bus at all. Channel A is inserted into the selected signal's mixer path by its Switch 111, and reaches the output in that manner.

In Dual-Channel Mode, both Channels A and B function as inserts to two signal mixer paths, and no mix is involved, so no direct connection to the master bus is made.

In "Normal" mode, the output signals of device 12 can be sent to the master bus (A to Left and B to Right) via a pair of faders.

FIG. 13 is a schematic of the second version mentioned above, which is a stand-alone unit which includes an automatic switching system and signal interface, and is designed to be externally connected to a typical pre-existing signal mixer and signal processors. This function is similar to that of FIG. 12, requiring the same control data as well as a control signal 128 from the sampler to switch 111 with an added function that mutes the selected channel in record mode. When recording, there is no output signal at amp 125, so no direct signal can appear in a mix somewhere down the line. This feature is useful in "Single+Mix" mode (described above) where a total mix without the selected channel is desired. However, this mix is not automatically created in this version and must be supplied by the user instead. The inputs for the mix are amps 126. Here switch 127 mainly directs inputs, creating a mono mix from inputs 126A and 126B for "Single+Mix" mode for channel B of preview sampler 12, as well as directing the output of preview sampler 12 channel B to both main outputs 123A and 123B. An additional resistor network (not shown) can reduce the input gain of the mono mix to prevent possible overload when two similar signals at inputs 126A and 126B are combined. In dual channel mode, the inputs 126 are muted, and the main outputs 123 are immaterial.

A type 4053 IC Triple 2-Channel Multiplexer with Inhibit can be used for each switch 111, 115, 117, and 127 in FIGS. 11, 12, and 13. The pinout diagram is given at FIG. 12*b*. Note that there are two physical switches for the single switch function labeled Switch 115.

FIG. 14 is a schematic diagram of one possible implementation of a logic device to be used with the examples of FIGS. 11, 12, and 13. The schematic of control data generation demonstrates a centralized user interface. The user selects the desired channel from an input device such as a keypad, data wheel, or scroll switch. (Another arrangement would provide channel selection at each channel placement on the signal mixer, similar to a solo switch). With added logic, bi-directional 8-bit 74F299 shift registers 141 and 142 are arranged to provide 1-of-9 data selection for directing signals in and out of sampler 12 channels A and B (not shown). Register 141 either allows normal operation (SMP Low) or sets channel A to an individual channel signal. Register 142 sets channel B to an individual channel signal (2CH High) or a mix when register 141 indicates sample mode (SMP High). These registers are manipulated with a four-button keypad 143, also labeled S1, S2, S3, S4. The register direction—scroll up or down—is set with SR latch 144, and the retriggerable monostable multivibrators 145 and 146 provide a clean clock pulse to registers 141 and 142 respectively for sequential scrolling. The channel and mode selection of registers 141 and 142 are converted by logic gates 147 into control data CS' and A'/B 1~8 for the signal switches described above. Channel selection can be displayed with LED bargraph 148.

Use of the present invention may have a particular advantage for detecting an intermittent fault in a device (e.g., a broken electronic device). Many devices develop faults that generate a spurious noise intermittently, sometimes only once every few hours. Waiting for this to happen is a problem for a technician, who usually will need to perceive the problematic behavior in order to determine its cause and solution. Using the preview sampler with threshold detection can record such an occurrence without the presence of a technician, who can analyze the recorded data after the occurrence. Additionally, a 'ready' signal, such as a light or sound, may be used to alert the user that the event has occurred. The threshold level is set above the 'noise floor' of the device with a null signal as input, and will thus trigger only when the spurious noise appears.

Where a test signal is desired or required for this use, the threshold input of the preview sampler may be fitted with a mixer that sums the input received from the device being tested to an inverted test signal directly from the signal generator. By balancing the relative levels in the mixer, the two can be summed to zero, and the threshold level set to the noise floor, as above. The trigger will go off only when the device being tested changes its behavior.

A second scenario is the use of a multi-channel embodiment, such as those of FIGS. 3, 4, or 5, to simultaneously record different parts of a circuit. This allows the technician to compare the circuit's behavior at different points and to determine which sections are behaving improperly. A switch at the preview sampler's output would facilitate viewing each recorded sample on an oscilloscope, for example. This scenario is particularly helpful when combined with the detection/correction of an intermittent error discussed above.

What is claimed is:

1. A method for providing one of a repeating signal and a repeating data stream from an input, comprising:

receiving an input from one of a signal source and a data source;

selecting one of a storage duration and a storage size;

one of recording and storing a selected segment from the input into a storage device, said selected segment having one of said selected storage duration and said selected storage size; and automatically repeatedly outputting said stored, selected segment of the input from said storage device.

2. The method of claim 1 further comprising:

processing said selected segment in a signal processor.

3. The method of claim 1 wherein said duration for individual musical sounds is between 0.5 and 1.5 seconds.

4. The method of claim 1 wherein said duration for phrases of musical sounds is between 1.0 and 4.0 seconds.

5. The method of claim 1 wherein said one of recording and storing step occurs when said data stream exceeds a predetermined threshold.

6. The method of claim 1 wherein said signal source is an analog signal.

7. The method of claim 1 wherein said repeated outputting commences upon at least one of:

a) completion of the storage step; and b) a signal sent by a user.

8. An apparatus for providing one of a repeating signal and a repeating data stream from an input, comprising:

an input to receive one of a data source and a signal source;

a preview sampler coupled to said input, said preview sampler adapted to store a selected segment from said input into a storage device, said preview sampler further adapted to allow selection of one of a storage duration and a storage size, and said preview sampler further adapted to automatically repeatedly output said selected segment from the storage device.

9. The apparatus of claim 8 further comprising:

a signal processor coupled to said preview sampler, said signal processor adapted to receive said selected segment, and further adapted to perform at least one signal processing function on said selected segment.

10. The apparatus of claim 9 further comprising:

an output device coupled to said signal processor, and adapted to receive and output said selected segment from said signal processor.

11. The apparatus of claim 8 wherein said duration for individual musical sounds is between 0.5 and 1.5 seconds.

12. The apparatus of claim 8 wherein said duration for phrases of musical sounds is between 1.0 and 4.0 seconds.

13. The apparatus of claim 8 further comprising:

a trigger detection circuit coupled to said preview sampler and said input, said trigger detection circuit adapted to sense when said input exceeds a predetermined threshold.

14. The apparatus of claim 8 wherein said preview sampler is adapted to commence storing of said selected segment when said input exceeds a predetermined threshold.

15. The apparatus of claim 8 wherein said signal source is an analog signal.

16. The apparatus of claim 8 wherein said repeated outputting commences upon at least one of:

a) completion of the storage step; and b) a signal sent by a user.

17. An apparatus for providing a repeating data stream from a data source, comprising:

a data source generating a data signal;

a preview sampler coupled to said data source, said preview sampler adapted to store a selected segment of said data signal, and further adapted to automatically repeatedly play said selected segment of the data signal; said apparatus further comprising a plurality of said data sources generating a plurality of data signals; wherein the preview sampler is adapted to store selected segments of input data signals and further adapted to automatically repeatedly play said selected segments;

a first switching device coupled to an output of each of said data sources, said switching device adapted to select one of said plurality of data sources and supply a selected data signal to a first input of said preview sampler; and a mixer coupled to said first switching device and said preview sampler, said mixer adapted to mix data signals from data sources not selected by said first switching device and supply a mixed signal to a second input of said preview sampler.

18. The apparatus of claim 17 further comprising:

a second switching device coupled to a first output of said preview sampler and said plurality of data sources, said second switching device adapted to output data signals from said data sources not selected by said first switching device and the data signal appearing at the first output of said preview sampler;

a plurality of signal processors coupled to said second switching device, each signal processor individually adapted to receive one of said data signals from said data sources not selected by said first switching device and the data signal appearing at the first output of said preview sampler; and a third switching device coupled to said signal processors and said mixer, said third switching device adapted to supply data signals from said signal processors not selected by said first switching device to said mixer and said data signal from one of said signal processors selected by said first switching device to an output device.

19. The apparatus of claim 18 further comprising:

a filtering circuit coupled to said preview sampler, said filtering circuit adapted to pre-emphasize selected frequency components of the data signal before the input of said preview sampler and de-emphasize selected frequency components of the data signal at the output of said preview sampler.

20. An apparatus for providing a repeating data stream from a data source, comprising:

a data source generating a data signal;

a preview sampler coupled to said data source, said preview sampler adapted to store a selected segment of said data signal, and further adapted to automatically repeatedly play said selected segment of the data signal; said apparatus further comprising a filtering circuit coupled to said preview sampler, said filtering circuit adapted to pre-emphasize selected frequency components of the data signal before the input of said preview sampler and de-emphasize selected frequency components of the data signal at the output of said preview sampler.

21. An apparatus for providing a repeating data stream from a data source, comprising:

a data source generating a data signal;

a preview sampler coupled to said data source, said preview sampler adapted to store a selected segment of said data signal, and further adapted to automatically repeatedly play said selected segment of the data signal; said apparatus further comprising a single-tap delay effect device including an input, an output and a storage device, said delay effect device adapted to store a selected segment of the data signal into the storage device, to delay outputting said stored data signal to the input of the single-tap delay effect device so as to repeatedly play said selected segment of the data signal from the storage device.

22. A method for providing a repeating data stream from a data source, comprising:

storing a selected segment of the data stream into a storage device, where said storage device is a single-tap delay effect device;

automatically repeatedly playing said selected segment of the data stream from said storage device; and delaying output of said stored data signal to an input of said single-tap delay effect device so as to repeatedly play said selected segment of the data signal.

23. A method for providing a repeating data stream from a data source, comprising:

storing a selected segment of the data stream into a storage device;

automatically repeatedly playing said selected segment of the data stream from said storage device;

providing emphasis of the pre-looped signal in at least one frequency range where artifacts may appear; and providing de-emphasis of the post-looped signal in the same said frequency range.

24. A method for providing a repeating data stream from a data source, comprising:

storing a selected segment of the data stream into a storage device;

automatically repeatedly playing said selected segment of the data stream from said storage device;

supplying an output of said storage device to one channel of a mixer;

supplying said data stream into a second channel of said mixer;

inverting a signal in one of the channels of said mixer;

mixing said outputs of said mixer to initially sum said signals to zero; and outputting said mixed signal to a threshold detector.

25. An apparatus for providing a repeating data stream from a data source, comprising:

a data source generating a data signal wherein said data source is a first device generating a source signal;

a preview sampler coupled to said data source, said preview sampler adapted to store a selected segment of said data signal, and further adapted to automatically repeatedly play said selected segment of the data signal;

an external device coupled to an output of said first device;

a two channel mixer, coupled to outputs of said first and external devices wherein one of said source signal from said first device and said signal from said external device is inverted by said mixer and initially summed to zero with the other of said signals; and a threshold detection device coupled to an output of said two channel mixer.

* * * * *